(12) United States Patent
Im

(10) Patent No.: US 9,751,413 B2
(45) Date of Patent: Sep. 5, 2017

(54) ELECTRIC VEHICLE CHARGING APPARATUS FOR CONTROLLING HEAT DURING CHARGING

(71) Applicant: LSIS CO., LTD., Anyang-si, Gyeonggi-do (KR)

(72) Inventor: Chang Jun Im, Asan-si (KR)

(73) Assignee: LSIS CO., LTD., Anyang-si (KR)

( * ) Notice: Subject to any disclaimer, the term of this patent is extended or adjusted under 35 U.S.C. 154(b) by 140 days.

(21) Appl. No.: 14/788,280

(22) Filed: Jun. 30, 2015

(65) Prior Publication Data

US 2016/0075244 A1 Mar. 17, 2016

(30) Foreign Application Priority Data

Sep. 15, 2014 (KR) ........................ 10-2014-0121999

(51) Int. Cl.
| | | |
|---|---|---|
| H01M 10/46 | (2006.01) | |
| B60L 11/18 | (2006.01) | |
| H01R 13/713 | (2006.01) | |
| H02J 7/00 | (2006.01) | |
| H01R 13/66 | (2006.01) | |

(52) U.S. Cl.
CPC ....... B60L 11/1818 (2013.01); B60L 11/1816 (2013.01); H01R 13/7137 (2013.01); H02J 7/007 (2013.01); H02J 7/0029 (2013.01); B60L 2230/12 (2013.01); H01R 13/6683 (2013.01); H01R 2201/26 (2013.01); Y02T 10/7005 (2013.01); Y02T 10/7088 (2013.01); Y02T 90/121 (2013.01); Y02T 90/14 (2013.01)

(58) Field of Classification Search
CPC ......... H02J 7/027; H02J 7/1453; H02J 7/1461
USPC ......................... 320/107, 111, 114, 150, 153
See application file for complete search history.

(56) References Cited

U.S. PATENT DOCUMENTS

| | | |
|---|---|---|
| 2009/0251832 A1 | 10/2009 | Brugner et al. |
| 2009/0316321 A1 | 12/2009 | Ouwerkerk |
| 2013/0335024 A1* | 12/2013 | Akai ............... H01M 10/44 320/109 |
| 2014/0070629 A1 | 3/2014 | Kondou et al. |
| 2014/0073189 A1 | 3/2014 | Kondou et al. |
| 2014/0120764 A1 | 5/2014 | Valadas et al. |

(Continued)

FOREIGN PATENT DOCUMENTS

| | | |
|---|---|---|
| CN | 201893456 | 7/2011 |
| CN | 203503843 | 3/2014 |
| CN | 103875134 | 6/2014 |

(Continued)

OTHER PUBLICATIONS

Translation of JP 2011-139572 (Jul. 14, 2011).*

(Continued)

*Primary Examiner* — Edward Tso
(74) *Attorney, Agent, or Firm* — Lee, Hong, Degerman, Kang & Waimey

(57) ABSTRACT

A charging apparatus is provided. The charging apparatus includes a plug supplying electrical energy to an electric vehicle (EV) through a plurality of plug pins; a plurality of temperature sensors disposed in the plug and measuring the temperatures of the plurality of plug pins; and a control unit determining the presence or absence of the overheating of the plug based on the temperatures measured from the plurality of temperature sensors.

10 Claims, 15 Drawing Sheets

(56) References Cited

U.S. PATENT DOCUMENTS

2014/0162491 A1 6/2014 Valadas et al.

FOREIGN PATENT DOCUMENTS

| | | |
|---|---|---|
| GB | 2489988 | 10/2012 |
| JP | 59156378 | 10/1984 |
| JP | 2000348825 | 12/2000 |
| JP | 2011-139572 | 7/2011 |
| JP | 2012196120 | 10/2012 |
| JP | 2013178118 | 9/2013 |
| JP | 2014056678 | 3/2014 |
| JP | 2014075333 | 4/2014 |
| JP | 2014523617 | 9/2014 |

OTHER PUBLICATIONS

Japan Patent Office Application Serial No. 2015-149640, Office Action dated Aug. 2, 2016, 2 pages.
European Patent Office Application Serial No. 15177603.6 Search Report dated Feb. 5, 2016, 7 pages.
State Intellectual Property Office of the People's Republic of China Application Serial No. 201510580350.4, Office Action dated Apr. 1, 2017, 7 pages.
Japan Patent Office Application No. 2015-149640, Notice of Allowance dated Feb. 21, 2017, 3 pages.

\* cited by examiner

ELECTRIC VEHICLE CHARGING APPARATUS FOR CONTROLLING HEAT DURING CHARGING

CROSS-REFERENCE TO RELATED APPLICATIONS

Pursuant to 35 U.S.C. §119(a), this application claims the benefit of earlier filing date and right of priority to Korean Patent Application No. 10-2014-0121999, filed on Sep. 15, 2014, the contents of which are hereby incorporated by reference herein in its entirety.

BACKGROUND

The present disclosure relates to charging an electric vehicle.

Electric vehicles mean vehicles operating by using electricity and may be roughly divided into battery-powered electric vehicles and hybrid electric vehicles. The battery-powered electric vehicles are vehicles running by using only electricity without using fossil fuel and are generally named as electric vehicles. In addition, the hybrid electric vehicles mean vehicles running by using electricity and fossil fuel. In addition, the electric vehicles include batteries supplying electricity for running. In particular, the battery-powered electric vehicles and plug-in type hybrid electric vehicles use power supplied from external power supplies to charge batteries, and use power charged in the batteries to operate electric motors.

When charging the electric vehicles by using 60 Hz commercial grid power that sockets in home provide, electric vehicle charging cable assemblies are used.

The electric vehicle charging cable assembly includes a connector connected to the electric vehicle, a plug connected to a socket, and a power cable connecting the connector to the plug.

The electric vehicle charging cable assembly may have a plug which is inserted into a socket for charging the electric vehicle. Since high current is used for charging the electric vehicle, many safety mechanisms are needed. The inside of the electric vehicle or the electric vehicle charging cable assembly has a safety mechanism that prepares for the high current. However, although the plug connected directly to the socket may also overheat due to an over-current, there is no safety mechanism for the plug.

Thus, ignition may occur due to overheating by the over-current flowing in the plug, or the electric vehicle charging cable assembly or the electric vehicle may have a fault. Also, fire due to overheating may also occur.

SUMMARY

Embodiments provide an electric vehicle charging cable assembly controlling heat through a temperature sensor when over-current flows in a plug and thus heat beyond an allowable value is generated from the plug.

Embodiments also provide an electric vehicle charging cable assembly increasing accuracy in measuring the temperature of each plug by disposing two temperature sensors adjacent to a plug pin when the temperature sensors are disposed at the plug.

Embodiments also provide an electric vehicle charging cable assembly preparing for the error situation of each sensor by connecting a resistor to each temperature sensor in the plug.

In one embodiment, a charging apparatus includes a plug supplying electrical energy to an electric vehicle (EV) through a plurality of plug pins; a plurality of temperature sensors disposed in the plug and measuring the temperatures of the plurality of plug pins; and a control unit determining the presence or absence of the overheating of the plug based on the temperatures measured from the plurality of temperature sensors.

The plurality of temperature sensors may be vertically disposed between the plug pins at certain intervals from the plug pins.

The plurality of temperature sensors may be disposed between the plug pins at certain intervals from the plug pins to have bilateral symmetry.

The plug may include a magnetic sensor measuring a magnetic field.

The plug may include a plurality of resistors connected to one end of the magnetic sensor.

The control unit may determine a charging mode based on the magnetic field measured by the magnetic sensor.

The plug may include resistors connected to one end of each of the plurality of temperature sensors.

The resistors connected to the plurality of temperature sensors may have different resistances, respectively.

The control unit may determine a short between circuits by using the resistors having different resistances.

The control unit may determine that the plug is in an overheated state when the temperatures measured by the plurality of temperature sensors are equal to or higher to a certain level.

The control unit may decrease an amount of charging or stop charging when it is determined that the plug is in the overheated state.

The control unit may preferentially apply an action of decreasing the amount of charging before an action of stopping charging.

The details of one or more embodiments are set forth in the accompanying drawings and the description below. Other features will be apparent from the description and drawings, and from the claims.

DETAILED DESCRIPTION OF THE EMBODIMENTS

Some embodiments are described below in more detail with reference to the accompanying drawings. Since the suffixes "module" and "unit" for components used in the following description are given and interchanged for easiness in making the present disclosure, they do not have distinct meanings or functions.

Mobile terminals described in the present disclosure may include cellular phones, smart phones, laptop computers, digital broadcasting terminals, personal digital assistants (PDAs), portable multimedia players (PMPs), and navigation devices. However, a person skilled in the art may easily appreciate that a configuration according to an embodiment described herein may be applied not only to the mobile terminals but also to fixed terminals, such as a digital TV, desktop computer, and so on, except when the configuration may be applied to only the mobile terminals.

In the following, a first embodiment of an electric vehicle (EV) charging system according to the present disclosure is described in more detail with reference to the accompanying drawings.

Figure 1:
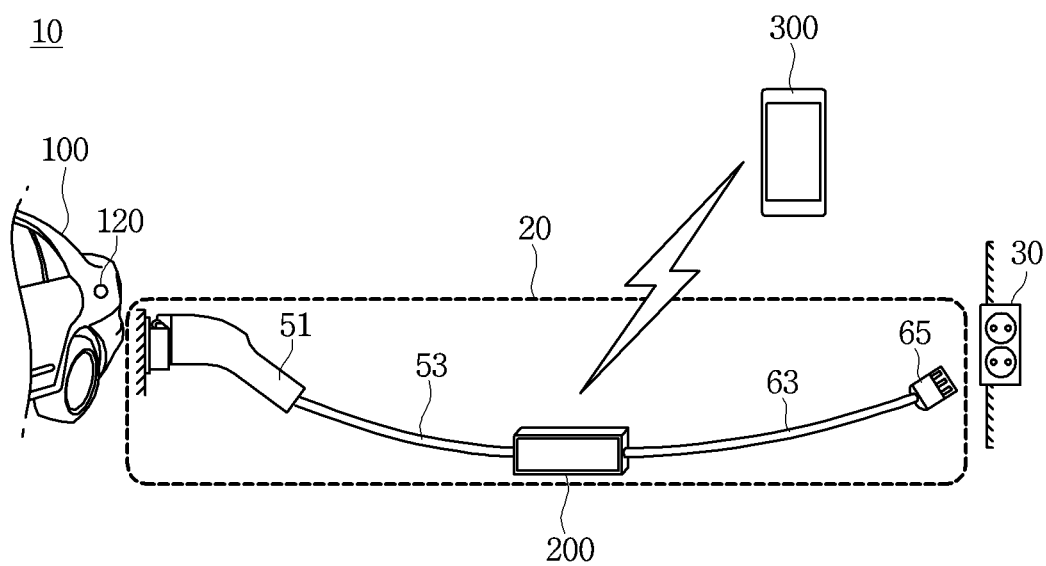
FIG. 1 is a conceptual diagram of an electric vehicle charging system according to an embodiment.

FIG. 1 is a conceptual diagram of an EV charging system according to an embodiment.

Referring to FIG. 1, an EV charging system 10 according to an embodiment includes an EV 100, an EV charging cable assembly 20, a socket 30, and a terminal device 300.

The socket 30 supplies alternating current (AC) power supplied from a grid.

The EV 100 is connected to the socket 30 through the EV charging cable assembly 20 to receive the AC power from the socket 30.

The EV charging cable assembly 20 transmits the AC power from the socket 30 to the EV 100.

The EV charging cable assembly 20 includes a cable-use charging control device 200, an EV connector 51, an EV-side power cable 53, a plug 65, and a grid-side power cable 63.

The EV-side power cable 53 and the grid-side power cable 63 transmit power.

The EV connector 51 may be inserted into an EV inlet 120 to be coupled to thereto and conform to the SAE J1772 standard.

The plug 65 is inserted into the socket 30 to be coupled thereto.

The cable-use charging control device 200 monitors the charging of the EV 100, provides charging related information obtained through the monitoring, to the terminal device 300 and controls the charging of the EV 100.

In an embodiment, the cable-use charging control device 200 is integrally attached to the power cable 53 so that it is not easily disconnected from the EV-side power cable 53 by a user, and has characteristics resistant to external temperature, external humidity, vibration, shock and so on.

In an embodiment, the cable-use charging control device 200 may include a connector to be capable of being coupled to and decoupled from the EV-side power cable 53 by a user. In this case, the connector needs to have characteristics resistant to external temperature, external humidity, vibration, shock and so on.

In an embodiment, the cable-use charging control device 200 is integrally attached to the power cable 63 so that it is not easily decoupled from the grid-side power cable 63 by a user, and has characteristics resistant to external temperature, external humidity, vibration and shock.

In an embodiment, the cable-use charging control device 200 may include a connector to be capable of being coupled to and decoupled from the EV-side power cable 53 by a user. In this case, the connector needs to have characteristics resistant to external temperature, external humidity, vibration, shock and so on.

When the cable-use charging control device 200 includes a connector for wired communication, it may be vulnerable to external conditions because the connector includes a metal terminal. In order to solve such a limitation, the cable-use charging control device 200 may transmit charging related information to the terminal device 300 wirelessly.

The terminal device 300 performs contactless, wireless communication with the EV charging cable assembly 20 and displays information on the EV charging cable assembly 20.

Figure 2:
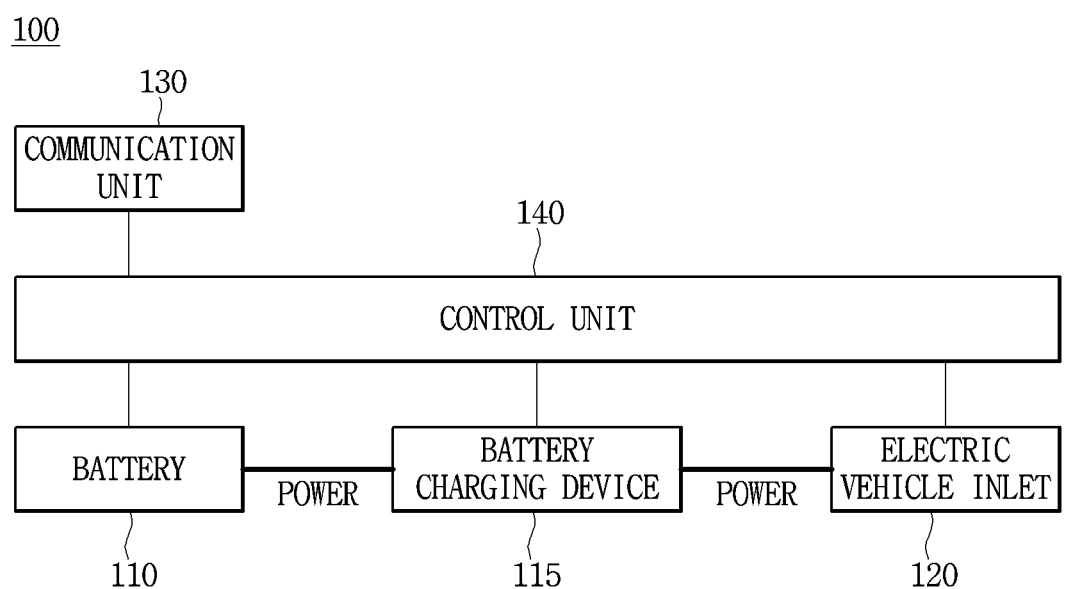
FIG. 2 is a block diagram of an electronic device according to an embodiment.

FIG. 2 is a block diagram of an EV according to an embodiment.

An EV 100 includes a battery 110, a battery charging device 115, an EV inlet 120, a communication unit 130, and a control unit 140.

The battery 110 supplies power for the operation of the EV 100 to the EV 100.

The EV inlet 120 is a connector for externally receiving power for the charging of the battery 110. The EV inlet 120 may conform to the SAE J1772 standard.

The battery charging device 115 uses power supplied through the EV inlet 120 to charge the battery 110.

The communication unit 130 may communicate with the EV charging cable assembly 20 or the terminal device 300.

The control unit 140 controls the overall operations of the EV 100.

Figure 3:
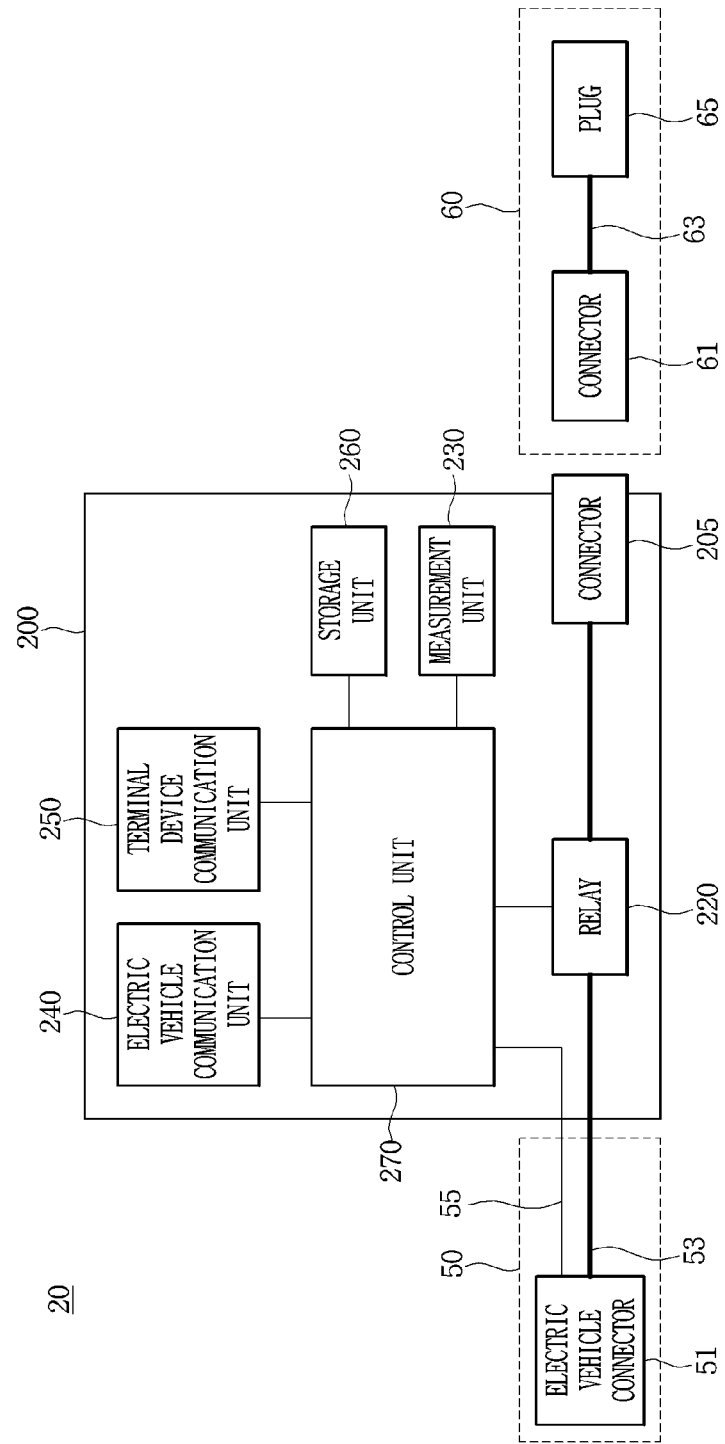
FIG. 3 is a block diagram of an electric vehicle charging cable assembly according to an embodiment.

FIG. 3 is a block diagram of an EV charging cable assembly according to an embodiment.

The EV charging cable assembly 20 includes a cable-use charging control device 200, an EV-side power cable assembly 50, and a grid-side power cable assembly 60.

In the following, the EV-side power cable assembly 50 and the grid-side power cable assembly 60 and also referred to as a sub cable assembly.

The EV-side power cable assembly 50 includes an EV connector 51, an EV-side power cable 53, and an EV-side data communication cable 55.

The grid-side power cable assembly 60 includes a connector 61, a grid-side power cable 63, and a plug 65.

The cable-use charging control device 200 includes a connector 205, at least one relay 220, a measurement unit 230, an EV communication unit 240, a terminal device communication unit 250, a storage unit 260 and a control unit 270.

The connector 205 is coupled to the connector 61. The connector 205 supports coupling to and decoupling from the connector 61. That is, the connector 205 may be coupled to and decoupled from the connector 61.

The at least one relay 220 controls the connection between the EV-side power cable 53 and the grid-side power cable 63. In particular, when the at least one relay 220 is turned off, it breaks the connection between the EV-side power cable 53 and the grid-side power cable 63. When the at least one relay 220 is turned on, it electrically connects the EV-side power cable 53 and the grid-side power cable 63.

The measurement unit 230 measures EV charging related information as will be described below. In particular, the measurement unit 230 may also measure both information on the EV 100 and information on the EV charging cable assembly 20. The measurement unit 230 may also measure information on the EV charging cable assembly 20, and not information on the EV 100.

The EV communication unit 240 performs communication with the EV 100. In particular, the EV communication unit 240 performs communication with the communication unit 130 of the EV 100. The EV communication unit 240 and the communication unit 130 may use a power cable communication method to perform communication through the power cable 53. Also, the EV communication unit 240 and the communication unit 130 may also use Infrared Data Association (IrDA), Radio Frequency, Bluetooth, Ultra Wideband (UWB), ZigBee, and Digital Living Network Alliance (DLNA) communication techniques to perform communication.

The terminal device communication unit 250 performs communication with a terminal device 300. In particular, the terminal device communication unit 250 performs communication with a communication unit 310 in the terminal device 300. In particular, the terminal device communication unit 250 and the communication unit 310 may also use Infrared Data Association (IrDA), Radio Frequency, Bluetooth, Ultra Wideband (UWB), ZigBee, and Digital Living Network Alliance (DLNA) communication techniques to perform communication.

The storage unit 260 stores pieces of information to be described below. In particular, the storage unit 260 may store EV charging related information. The storage unit 260 may store information on the usage history of the cable-use charging control device 210. For example, the storage unit 260 may store information on the last usage time and time length and accumulated usage time length of the cable-use charging control device 210.

The control unit 270 controls the overall operations of the cable-use charging control device 200, including operations to be described below.

Figure 4:
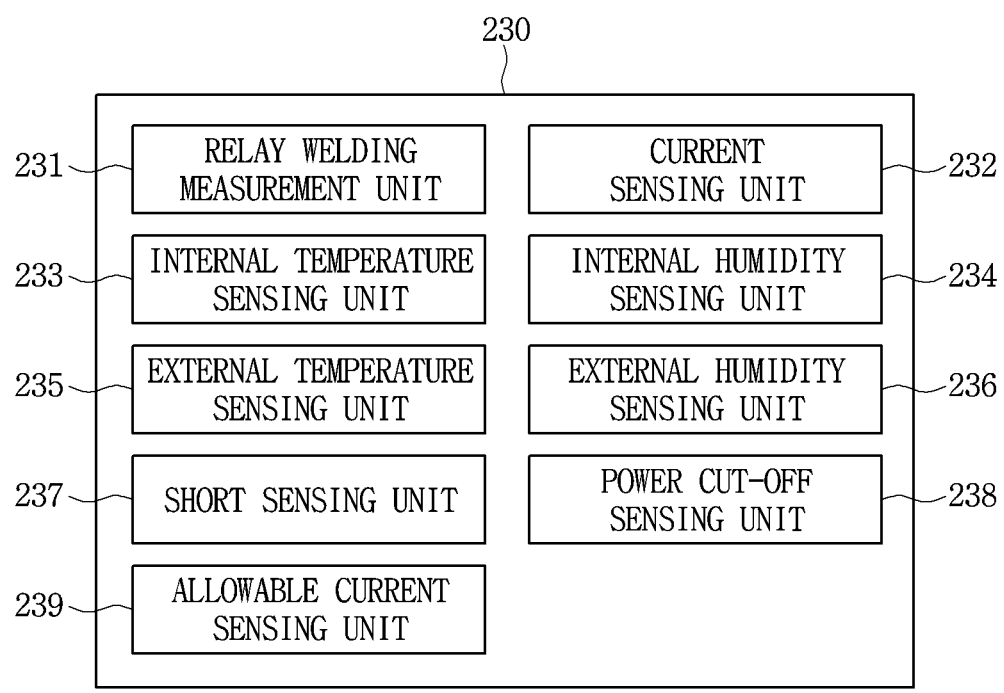
FIG. 4 is a block diagram of a measurement unit according to an embodiment.

FIG. 4 is a block diagram of a measurement unit according to an embodiment.

As shown in FIG. 4, the measurement unit 230 may include a relay welding measurement unit 231, a current measurement unit 232, an internal temperature measurement unit 233, an internal humidity measurement unit 234, an external temperature measurement unit 235, an external humidity measurement unit 236, a short measurement unit 237, a disconnection measurement unit 238, and an allowable current measurement unit 239.

The relay welding measurement unit 231 may measure whether at least one relay 220 has been welded.

The current measurement unit 232 may measure the size of a current flowing through the power cable 53.

The internal temperature measurement unit 233 may measure the internal temperature of the EV charging cable assembly 20.

The internal humidity measurement unit 234 may measure the internal humidity of the EV charging cable assembly 20.

The external temperature measurement unit 235 measures temperature around the cable-use charging control device 200.

The external humidity measurement unit 236 measures humidity around the cable-use charging control device 200.

The short measurement unit 237 may measure whether the EV charging cable assembly 20 has been shorted.

The disconnection measurement unit 238 may measure whether the EV charging cable assembly 20 has been disconnected.

The allowable current measurement unit 239 may include a first allowable current measurement unit and a second allowable current measurement unit.

The first allowable current measurement unit measures the allowable current of the EV-side power cable assembly 50. In particular, the first allowable current measurement unit measures the allowable current of the EV-side power cable 53.

The second allowable current measurement unit measures the allowable current of the grid-side power cable assembly 60. In particular, the second allowable current measurement unit measures the allowable current of the grid-side power cable.

Figure 5:
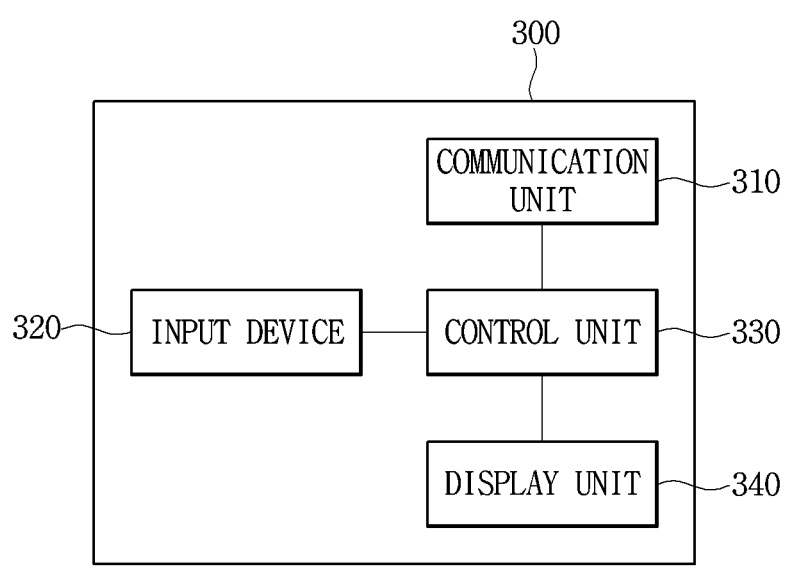
FIG. 5 is a block diagram of a terminal device according to an embodiment.

FIG. 5 is a block diagram of a terminal device according to an embodiment.

A terminal device 300 includes a communication unit 310, an input device 320, a control unit 330, and a display unit 340.

The communication unit 310 communicates with the terminal device communication unit 250.

The input device 320 obtains a user input. The input device 320 may include one or more of a touch screen, a physical button, a microphone for obtaining a user input in the form of voice, an acceleration sensor for obtaining the motion gesture of the terminal device 300 as a user input, a keyboard, a mouse, and a keypad.

The control unit 330 controls the overall operations of the terminal device 300 including operations to be described below.

The display unit 340 displays information on the charging operation and state of the cable-use charging control device 200. Also, the display unit 340 may display information on the fault of the cable-use charging control device 200 and on user actions corresponding thereto. For example, the display unit 340 may display the information on the charging operation and state of the cable-use charging control device 200, by using a visual display method including at least one of a character, figure and light and/or by using an auditory output method including sound.

Figure 6:
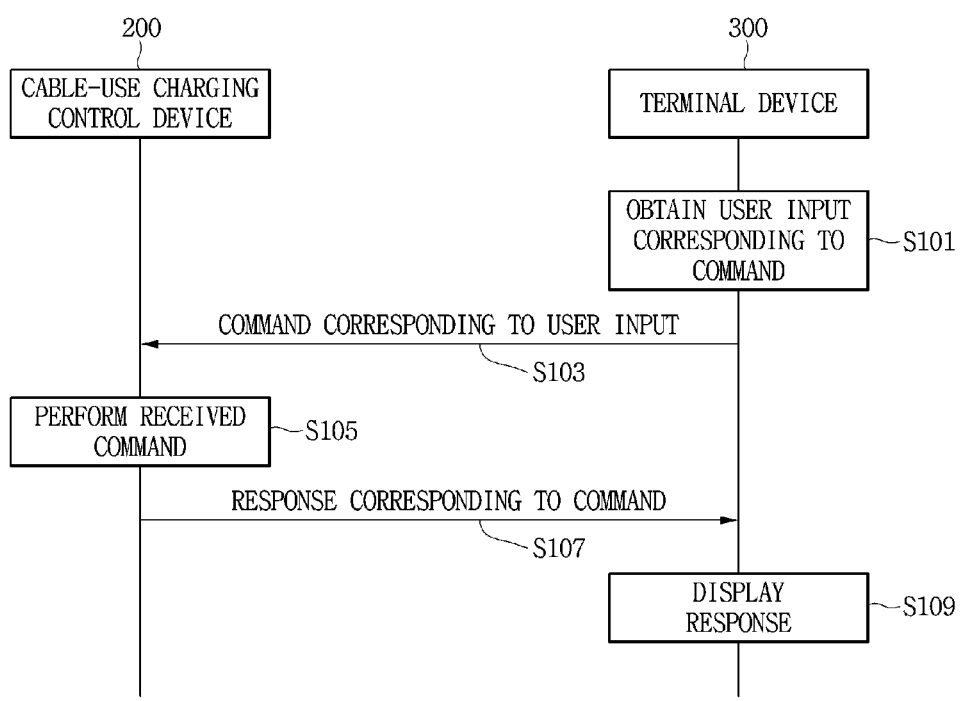
FIG. 6 is a ladder diagram showing an operating method of an electric vehicle charging system according to an embodiment.

FIG. 6 is a ladder diagram showing an operating method of the EV charging system 10 according to an embodiment.

The control unit 330 of the terminal device 300 obtains a user input for ordering the EV charging cable assembly 20 through the input device 320 in step S101. In this case, the user input for the control of the EV charging cable assembly 20 may include one or more of the charging start of the EV 100, the charging stop of the EV 100 and a request for EV charging related information.

The control unit 330 of the terminal device 300 transmits a command corresponding to the obtained user input to the cable-use charging control device 200 through the communication unit 310 in step S103. The control unit 270 of the cable-use charging control device 200 receives the command through the terminal device communication unit 250.

The control unit 270 of the cable-use charging control device 200 performs the received command in step S105.

In particular, if the command corresponding to the user input is the charging start of the EV 100, the control unit 270 of the cable-use charging control device 200 turns on at least one of relays 220 turned off so that the EV charging cable assembly 20 may supply AC power from the socket 30 to the EV 100.

More particularly, if the command corresponding to the user input is the charging start of the EV 100, the control unit 270 of the cable-use charging control device 200 provides at least one of information on the allowable current of the EV-side power cable assembly 50 and information on the allowable current of the grid-side power cable assembly 60 to the battery charging device 115 of the EV 100 through the EV-side data communication cable 55. In addition, the control unit 270 of the cable-use charging control device 200 turns on at least one of relays 220 turned off. Then, the battery charging device 115 of the EV 100 may determine a charging current based on the provided information and then take the determined charging current through the EV charging cable assembly 20 to charge the battery 110.

If the control unit 270 provides information on the allowable current of the EV-side power cable assembly 50, the battery charging device 115 of the EV 100 may use a current smaller than or equal to the allowable current to charge the battery 110.

If the control unit 270 provides information on the allowable current of the grid-side power cable assembly 60, the battery charging device 115 of the EV 100 may use a current smaller than or equal to the allowable current to charge the battery 110.

If the control unit 270 provides information on the allowable current of the EV-side power cable assembly 50 and information on the allowable current of the grid-side power cable assembly 60, the battery charging device 115 of the EV 100 may use a current smaller than or equal to a smaller one of the two allowable currents to charge the battery 110.

If the command corresponding to the user input is the charging stop of the EV 100, the control unit 270 of the cable-use charging control device 200 turns off at least one of relays 220 turned on so that the EV charging cable assembly 20 is not longer able to charge the EV 100.

If the command corresponding to the user input is the request for the EV charging related information, the control unit 270 of the cable-use charging control device 200 collects EV charging related information.

The control unit 270 of the cable-use charging control device 200 transmits a response corresponding to the received command to the terminal device 300 through the terminal device communication unit 250 in step S107.

If the command corresponding to the user input is the charging start of the EV 100, the response may include information notifying that the state of at least one relay 220 is in a turn-on state.

If the command corresponding to the user input is the charging stop of the EV 100, the response may include information notifying that the state of at least one relay 220 is in a turn-off state.

If the command corresponding to the user input is the request for the EV charging related information, the response may include collected EV charging related information.

The EV charging related information may include at least one of information on the EV 100 and information on the EV charging cable assembly 20.

The information on the EV 100 may include at least one of an initial charged state, the current charged state, a charging start time, a predicted charging end time, an actual charging end time, EV charging status information, EV charging error information, information on power supplied to the EV 100, and information on the size of a current applied to the EV 100. The initial charged state and the current charged state may be represented by a ratio of the current amount of charging to gross capacity of the battery 110. The EV charging status information may represent whether the EV 100 is being charged, waits for charging or has been completely charged.

The information on the EV charging cable assembly 20 may include at least one of information on the charging operation of the EV charging cable assembly 20, information on the usage history of the EV charging cable assembly 20, state information on the EV charging cable assembly 20, information on the fault of the EV charging cable assembly 20, information on the allowable current of the EV-side power cable assembly 50, and information on the allowable current of the grid-side power cable assembly 60. The information on the charging operation of the EV charging cable assembly 20 may represent whether the EV charging cable assembly 20 supplies power from the socket 30 to the EV 100. The state information on the EV charging cable assembly 20 may include at least one of information on the state of at least one relay 220, information on whether at least one relay 220 has been welded, information on the temperature of the EV charging cable assembly 20, information on the short of the EV charging cable assembly 20, information on the disconnection of the EV charging cable assembly 20, and environmental information around the EV charging cable assembly 20. The information on the state of the at least one relay 220 may represent whether the at least one relay 220 has been turned on or off. The environmental information around the EV charging cable assembly 20 may include at least one of information on ambient temperature and information on ambient humidity.

The control unit 330 of the terminal device 300 displays a received response on the display unit 340 in step S109.

If the command corresponding to the user input is the charging start of the EV 100, a control unit 330 of the terminal device 300 may display, on the display unit 340 information notifying that the state of at least one relay 200 is in a turn-on state.

If the command corresponding to the user input is the charging stop of the EV 100, the control unit 330 of the terminal device 300 may display, on the display unit 340 information notifying that the state of at least one relay 200 is in a turn-off state.

If the command corresponding to the user input is the request for the EV charging related information, the control unit 330 of the terminal device 300 may display EV charging related information on the display unit 340. A user may input an additional user input for the control of the EV charging cable assembly 20 to the terminal device 300 through the input device 320 with reference to the displayed EV charging related information.

As such, information on the charging operation and state of the EV charging cable assembly 20 is displayed through the terminal device 300. Thus, a user may more conveniently and easily recognize the information on the charging operation and state of the EV charging cable assembly 20. Also, the user may more easily determine the fault state and part of the EV charging cable assembly 20 through the information on the state of the EV charging cable assembly 20 to be capable of taking actions rapidly. For example, when the ground cable between the EV charging cable assembly 20 and a commercial power supply is shorted, it was typically difficult to measure it. However, since in the present embodiment, the measurement unit 230 measures and displays the presence or absence of a disconnection state, the user may stop the charging operation of the EV charging cable assembly 20 and repair a disconnection part or request for a repair. In particular, when information on the fault and corresponding action of the EV charging cable assembly 20 is transmitted from the cable-use charging control device 200 to the terminal device 300, the user may more conveniently and easily recognize the presence or absence of a fault state and take an action. Thus, the user may previously recognize that the EV 100 is not charged due to the fault of the EV charging cable assembly 20. Also, when e.g., the usage history of the EV charging cable assembly 20 is transmitted to the terminal device 300, the user may predict the lifespan of the EV charging cable assembly 20 and prepare an extra EV charging cable assembly. Since the EV charging cable assembly 20 is used in a bad environment in many cases, it may cause frequent repair and replacement. However, when the EV charging cable assembly 20 has a cable-use charging control device 200 including the terminal device communication unit 250 which is relatively expensive, it may be more difficult to repair due to the characteristics of the cable-use charging control device 200 manufactured to have characteristics resistant to external temperature, external humidity, vibration, shock and so on and it is cause an increase in cost-bearing when replacement is performed. In order to solve such a limitation, it is possible to consider providing the terminal device communication unit of the cable-use charging control device 200 as a separate device. Such an embodiment is described with reference to FIGS. 7 to 10.

Figure 7:
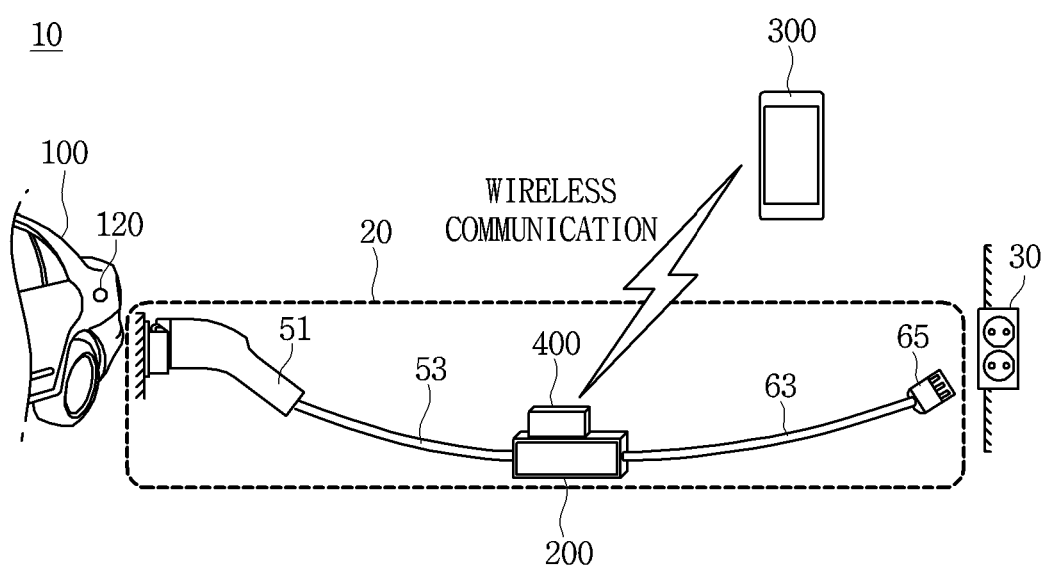
FIG. 7 is a conceptual diagram of an electric vehicle charging system according to another embodiment.

FIG. 7 is a conceptual diagram of an EV charging system according to another embodiment.

Referring to FIG. 7, an EV charging system 10 according to an embodiment includes an EV 100, an EV charging cable assembly 20, a socket 30, a terminal device 300, and an add-on communication device 400.

In particular, since the system in FIG. 7 is obtained by adding the add-on communication device 400 to the system in FIG. 1 and thus other parts excluding the add-on communication device 400 are the same, their detailed descriptions are omitted.

The cable-use charging control device 200 monitors the charging of the EV 100, provides charging related information obtained through the monitoring, to the add-on communication device 400 and controls the charging of the EV 100.

When the cable-use charging control device 200 includes a connector for wired communication, it may be vulnerable to external conditions because the connector includes a metal terminal. In order to solve such a limitation, the cable-use charging control device 200 may communicate with the add-on communication device 400 wirelessly.

The terminal device 300 performs contactless, wireless communication with the add-on communication device 400 to display information on the EV charging cable assembly 20.

The add-on communication device 400 is attached to the cable-use charging control device 200. In this case, the add-on communication device 400 may also be mechanically coupled to the cable-use charging control device 200. Also, the add-on communication device 400 may also be attached to the cable-use charging control device 200 by magnetism.

Figure 8:
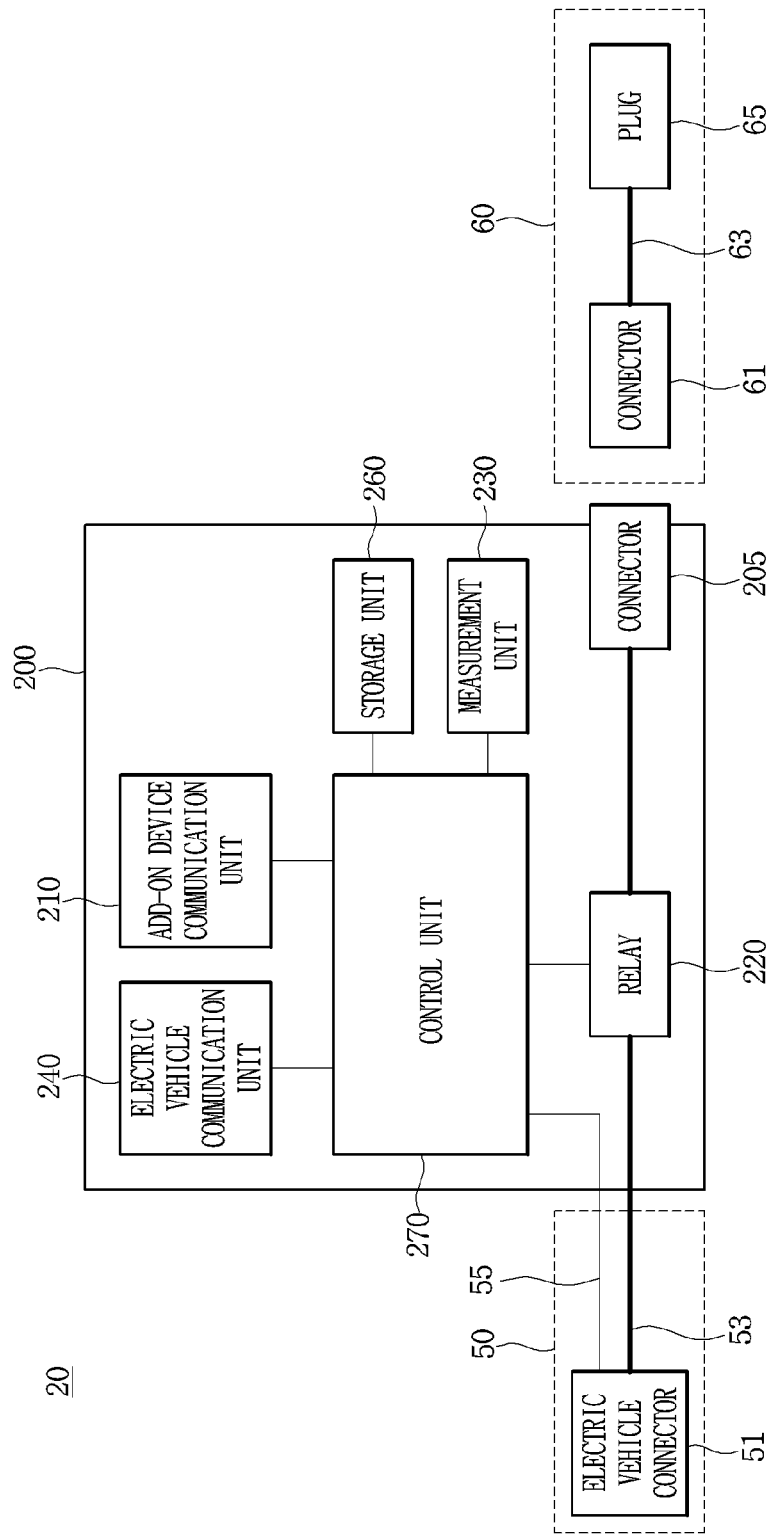
FIG. 8 is a block diagram of an electric vehicle charging cable assembly according to another embodiment.

FIG. 8 is a block diagram of an EV charging cable assembly according to another embodiment.

When compared to the embodiment in FIG. 3, the cable-use charging control device 200 in FIG. 8 further includes an add-on device communication unit 210. Also, the cable-use charging control device 200 in FIG. 8 may not have a terminal device communication unit 250 in order to lower purchase cost and repair cost but it is also possible to include the terminal device communication unit 250 in various applications.

The operations of at least one relay 220, a measurement unit 230, an EV communication unit 240, a storage unit 260 and a control unit 270 are the same or similar as those in the embodiment in FIG. 3 or are described below.

The add-on device communication unit 210 performs communication with the add-on communication device 400. The add-on device communication unit 210 and the add-on communication device 400 may also use Infrared Data Association (IrDA), Radio Frequency communication, Bluetooth, Ultra Wideband (UWB), ZigBee, and Digital Living Network Alliance (DLNA) communication techniques to perform communication.

In particular, in order to lower the costs of the EV charging cable assembly 20 and the add-on communication device 400, the add-on device communication unit 210 may use an IrDA communication technique. In this case, the add-on device communication unit 210 may include an infrared light-emitting diode and an infrared light-receiving diode.

Figure 9:
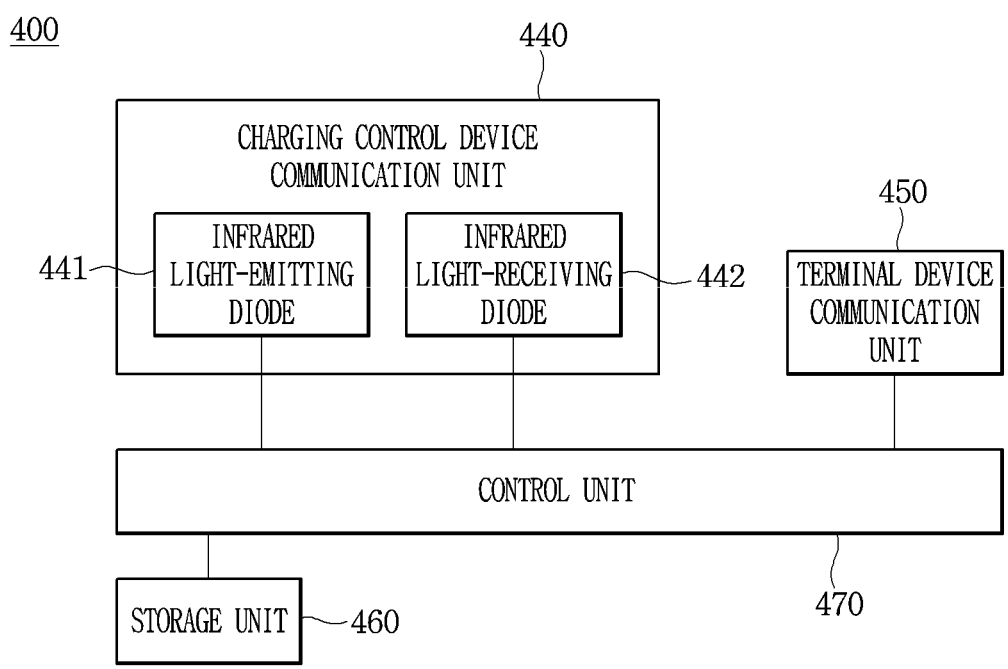
FIG. 9 is a block diagram of an add-on communication device according to an embodiment.

FIG. 9 is a block diagram of an add-on communication device according to an embodiment.

The add-on communication device 400 includes a charging control device communication unit 440, a terminal device communication unit 450, a storage unit 460, and a control unit 470.

The charging control device communication unit 440 performs communication with a cable-use charging control device 200. In particular, the charging control device communication unit 440 communicates with the add-on device communication unit 210 of the cable-use charging control device 200. The charging control device communication unit 440 and the add-on device communication unit 210 may also use Infrared Data Association (IrDA), Radio Frequency, Bluetooth, Ultra Wideband (UWB), ZigBee, and Digital Living Network Alliance (DLNA) communication techniques to perform communication.

In order to lower the costs of the EV charging cable assembly 20 and the add-on communication device 400, the charging control device communication unit 440 may use an IrDA communication technique. In this case, the charging control device communication unit 440 may include an infrared light-emitting diode 441 and an infrared light-receiving diode 442.

When the add-on communication device 400 is normally attached to the cable-use charging control device 200, the positions of the infrared light-emitting diode 441 and the infrared light-receiving diode 442 of the charging control device communication unit 440 match the infrared light-receiving diode and the infrared light-emitting diode of the add-on device communication unit 210 of the cable-use charging control device 200, respectively.

The terminal device communication unit 450 performs communication with the terminal device 300. In particular, the terminal device communication unit 450 performs communication with the communication unit 310 of the terminal device 300. In particular, the terminal device communication unit 450 and the communication unit 310 may also use Infrared Data Association (IrDA), Radio Frequency, Bluetooth, Ultra Wideband (UWB), ZigBee, and Digital Living Network Alliance (DLNA) communication techniques to perform communication. In particular, the terminal device communication unit 450 may use at least one of a Wireless Local Area Network (WLAN), such as WiFi defined in IEEE 802.11, and a Wireless Wide Area Network (WWAN) defined in IEEE 802.16 or Long Term Evolution (LTE) standard to perform communication with the terminal device 300.

The storage unit 460 stores pieces of information to be described below. In particular, the storage unit 460 may store EV charging related information. The storage unit 460 may store information on the usage history of the cable-use charging control device 210. For example, the storage unit 460 may store information on the last usage time and time length and accumulated usage time length of the cable-use charging control device 200.

The control unit 470 controls the overall operations of the add-on communication device 400, including operations to be described below.

Since the add-on communication device 400 is not electrically in direct contact with the cable-use charging control device 200, it has no need to separately receive power. However, when a user does not use the add-on communication device 400, the user may not cut off power supply to the add-on communication device 400. Since it unnecessarily increases power consumption, there is a need for a solution that may minimize power consumption when the add-on communication device 400 is not used.

Figure 10:
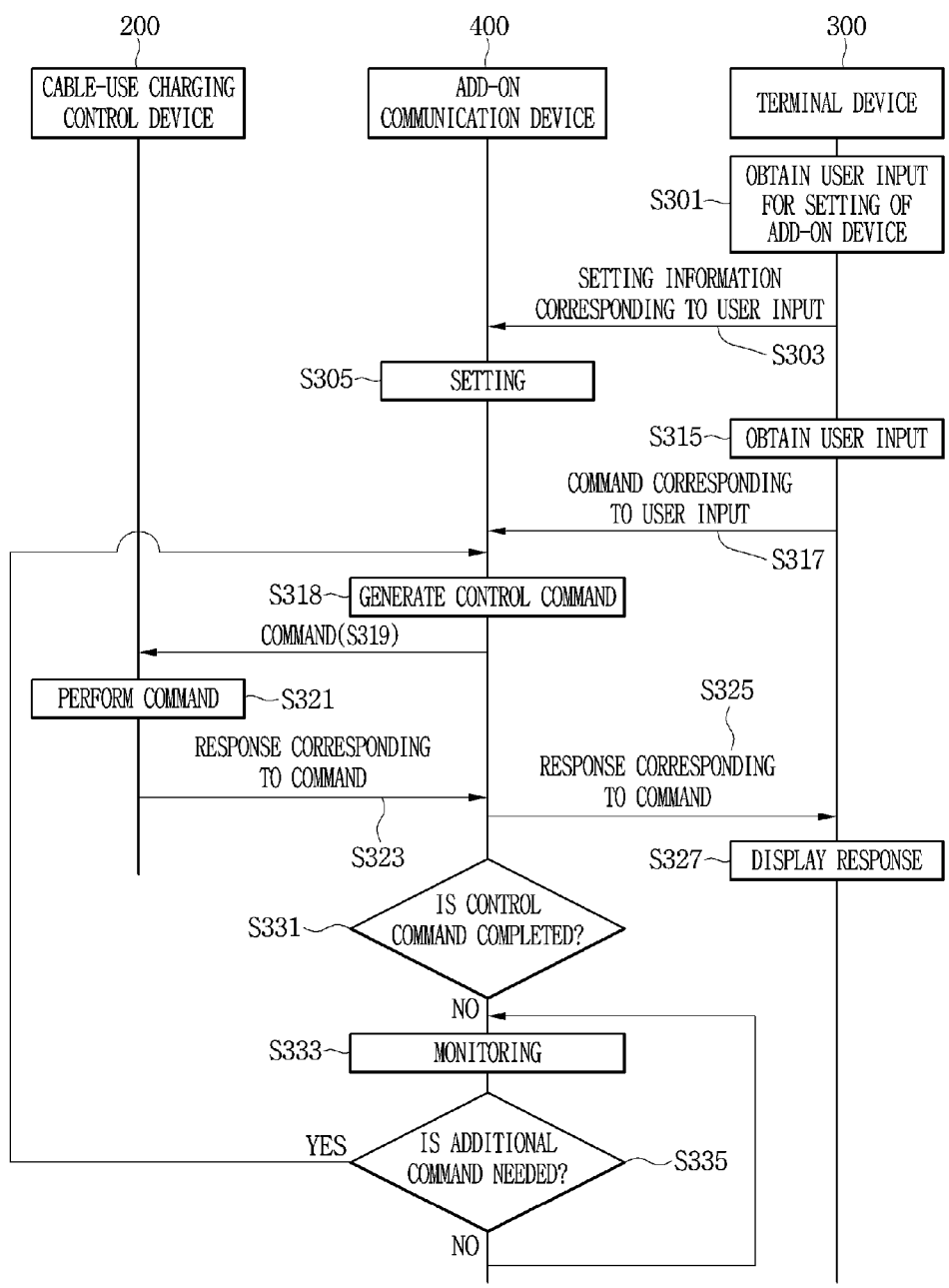
FIG. 10 is a ladder diagram showing an operating method of an electric vehicle charging system according to another embodiment.

FIG. 10 is a ladder diagram showing an operating method of the electric vehicle charging system 10 according to another embodiment.

The control unit 330 of the terminal device 300 obtains a user input for the setting of the add-on communication device 400 through the input device 320 in step S301. The user input for the setting of the add-on communication device 400 may include at least one of a charging limit and a charging mode. The charging limit may include at least one of a charging limit in a public area and a charging limit in a home area. The charging mode may include at least one of a charging mode in the public area and a charging mode in the home area. The charging limit may be an absolute value expressed in units of Wh or a relative value expressed in units of %. A set of values that the charging mode may represent may include a fast charging mode and a slow charging mode.

The control unit 330 of the terminal device 300 controls the communication unit 310 so that setting information corresponding to a user input obtained by the communication unit 310 is transmitted to the add-on communication device 400 through the EV-side data communication line 55 in step S303. In this case, the setting information may include at least one of setting information on the charging limit and setting information on the charging mode. The setting information on the charging limit may include at least one of setting information on the charging limit in the public area and the setting information on the charging limit in the home area. The setting information on the charging mode may include at least one of setting information on the charging mode in the public area and setting information on the charging mode in the home area. Accordingly, the control unit 470 of the add-on communication device 400 receives setting information from the terminal device 300 through the terminal device communication unit 450.

The add-on communication device 400 stores the received setting information in the storage unit 460 and sets the add-on communication device 400 based on the received setting information in step S305.

The control unit 330 of the terminal device 300 obtains a user input for ordering the EV charging cable assembly 20 through the input device 320 in step S315. In this case, the user input for the control of the EV charging cable assembly 20 may include one or more of the charging start of the EV 100, the charging stop of the EV 100 and a request for EV charging related information. The user input may include at least one of a fast charging start and a slow charging start.

The control unit 330 of the terminal device 300 transmits a command corresponding to the obtained user input to the add-on communication device 400 through the communication unit 310 in step S317. The control unit 470 of the add-on communication device 400 may receive a command from the terminal device 300 through the terminal device communication unit 450. In this case, a set of values that the command may represent may include the charging start of the EV 100, the charging stop of the EV 100, and a request for EV charging related information. A set of values that the charging start of the EV 100 may represent may include the fast charging start and slow charging start of the EV 100.

The control unit 470 of the add-on communication device 400 generates a control command for the control of the cable-use charging control device 200 in step S318. The control unit 470 of the add-on communication device 400 may generate a control command based on at least one of a command received from the terminal device 300, the current position, setting information, and the charged stage of the EV 100 being a result of monitoring to be described below. In this case, a set of values that the control command may represent may include a charging start, a charging stop, and a request for EV charging related information. A set of values that the charge start may represent may include a fast charging start and a slow charging start.

In an embodiment, when the command received from the terminal device 300 is the charging start, the control unit 470 of the add-on communication device 400 may generate a control command representing the charging start.

In an embodiment, when the command received from the terminal device 300 is the fast charging start, the control unit 470 of the add-on communication device 400 may generate a control command representing the fast charging start.

In an embodiment, when the command received from the terminal device 300 is the slow charging start, the control unit 470 of the add-on communication device 400 may generate a control command representing the slow charging start.

In an embodiment, when the command received from the terminal device 300 is the charging start and the set charging mode is the fast charging mode, the control unit 470 of the add-on communication device 400 may generate a control command representing the fast charging start.

In an embodiment, when the command received from the terminal device 300 is the charging start and the set charging mode is the slow charging mode, the control unit 470 of the add-on communication device 400 may generate a control command representing the slow charging start.

In an embodiment, when the command received from the terminal device 300 is the charging stop, the control unit 470 of the add-on communication device 400 may generate a control command representing the charging stop.

In an embodiment, when the command received from the terminal device 300 is the request for the EV charge related information, the control unit 470 of the add-on communication device 400 may generate a control command representing the request for the EV charge related information.

In an embodiment, when the command received from the terminal device 300 is the charging start and the current position is the home area, the control unit 470 of the add-on communication device 400 may generate a control command representing the charging start according to the set charging mode in the home area. In particular, when the set charging mode in the home area is the fast charging mode, the control unit 470 of the add-on communication device 400 may generate a control command representing the fast charging start. When the set charging mode in the home area is the slow charging mode, the control unit 470 of the add-on communication device 400 may generate a control command representing the slow charging start.

In an embodiment, when the command received from the terminal device 300 is the charging start and the current position is the public area, the control unit 470 of the add-on communication device 400 may generate a control command representing the charging start according to the set charging mode in the public area. In particular, when the set charging mode in the public area is the fast charging mode, the control unit 470 of the add-on communication device 400 may generate a control command representing the fast charging start. When the set charging mode in the public area is the slow charging mode, the control unit 470 of the add-on communication device 400 may generate a control command representing the slow charging start.

In an embodiment, when the command received from the terminal device 300 is the charging start and the current position is the home area, the control unit 470 of the add-on communication device 400 may generate a control command representing the slow charging start.

In an embodiment, when the command received from the terminal device 300 is the charging start and the current position is the public area, the control unit 470 of the add-on communication device 400 may generate a control command representing the fast charging start.

In an embodiment, when the command received from the terminal device 300 is the charging start and as a result of monitoring, power supplied to the EV 100 reaches the set charging limit, the control unit 470 of the add-on communication device 400 may generate a control command representing the charging stop.

In an embodiment, when the command received from the terminal device 300 is the charging start, the current position is the home area, and as a result of monitoring, power supplied to the EV 100 reaches the set charge limit in the home area, the control unit 470 of the add-on communication device 400 may generate a control command representing the charging stop.

In an embodiment, when the command received from the terminal device 300 is the charging start, the current position is the public area, and as a result of monitoring, power supplied to the EV 100 reaches the set charging limit in the public area, the control unit 470 of the add-on communication device 400 may generate a control command representing the charging stop.

To this end, the control unit 470 of the add-on communication device 400 may obtain the current position of the EV 100. The control unit 470 of the add-on communication device 400 may use one or more of global positioning system (GPS) information, base station information on a WLAN, base station information on a WWAN to obtain the current position of the EV 100.

A set of values that the current position may represent may be the home area and the public area.

The control unit 470 of the add-on communication device 400 transmits the generated control command to the cable-use charging control device 200 through the charging control device communication unit 440 in step S319. An infrared light-emitting diode 441 of the charging control device communication unit 440 may irradiate an infrared ray having a digital pattern corresponding to the generated control command.

The control unit 270 of the cable-use charging control device 200 performs the received control command in step S321.

In particular, if the command corresponding to the user input is the charging start of the EV 100, the control unit 270 of the cable-use charging control device 200 turns on at least one of relays 220 turned off so that the EV charging cable assembly 20 may supply AC power from the socket 30 to the EV 100.

If the command corresponding to the user input is the fast charging start of the EV 100, the control unit 270 of the cable-use charging control device 200 turns on at least one of relays 220 turned off so that the EV charging cable assembly 20 may fast supply AC power from the socket 30 to the EV 100.

If the command corresponding to the user input is the slow charging start of the EV 100, the control unit 270 of the cable-use charging control device 200 turns on at least one of relays 220 turned off so that the EV charging cable assembly 20 may slowly supply AC power from the socket 30 to the EV 100.

If the command corresponding to the user input is the charging stop of the EV 100, the control unit 270 of the cable-use charging control device 200 turns off at least one of relays 220 turned on so that the EV charging cable assembly 20 is not longer able to charge the EV 100.

If the command corresponding to the user input is the request for the EV charging related information, the control unit 270 of the cable-use charging control device 200 collects EV charging related information.

The control unit 270 of the cable-use charging control device 200 transmits a response corresponding to the received command to the add-on communication device 400 through the add-on device communication unit 250 in step S323. The infrared light-emitting diode of the add-on device communication unit 210 of the cable-use charging control device 200 may irradiate an infrared ray having a digital pattern corresponding to a response corresponding to the received command. The control unit 470 of the add-on communication device 400 may receive a response from the cable-use charging control device 200 through the charging control device communication unit 440.

If the command corresponding to the user input is the charging start of the EV 100, the response may include information notifying that the state of at least one relay 220 is in a turn-on state.

If the command corresponding to the user input is the fast charging start of the EV 100, the response may include information notifying that the state of at least one relay 220 is in a turn-on state for fast charging.

If the command corresponding to the user input is the slow charging start of the EV 100, the response may include information notifying that the state of at least one relay 220 is in a turn-on state for slow charging.

If the command corresponding to the user input is the charging stop of the EV 100, the response may include information notifying that the state of at least one relay 220 is in a turn-off state.

If the command corresponding to the user input is the request for the EV charging related information, the response may include collected EV charging related information. As described earlier, the EV charging related information may include at least one of information on the EV 100 and information on the EV charging cable assembly 20.

The control unit 470 of the add-on communication device 400 transmits a received response to the terminal device 300 through the terminal device communication unit 450 in step S325.

The control unit 330 of the terminal device 300 displays a received response on the display unit 340 in step S327. Since the operation described in step S109 may be applied to the operation in step S327, detailed descriptions for the operation in step S327 are omitted.

The control unit 470 of the add-on communication device 400 checks whether a generated control command has been completed in step S331.

When the generated control command is a charging start, a charging limit has been set, and charging is not yet completed, the control unit 470 of the add-on communication device 400 may determine that the generated control command has not been completed.

When the generated control command is a charging stop or a request for EV charge related information or the control command is the charging start while the charging limit has not been set, the control unit 470 of the add-on communication device 400 may determine that the generated control command has been completed.

When the received control command is completed, the control unit 470 of the add-on communication device 400 may wait for the reception of new setting information or a new command.

When the generated control command has not been completed, the control unit 470 of the add-on communication device 400 monitors the charged state of the EV 100 in step S333. In particular, the control unit 470 of the add-on communication device 400 may monitor power supplied to the EV 100.

The control unit 470 of the add-on communication device 400 checks based on at least one of the charged state of the EV 100 and setting information thereon whether the cable-use charging control device 200 needs an additional control command, in step S335. In particular, the control unit 470 of the add-on communication device 400 may compare power supplied to the EV 100 with a set charging limit to check whether the cable-use charging control device 200 needs an additional control command. When the power supplied to the EV 100 reaches the set charging limit, the control unit 470 of the add-on communication device 400 may determine that the cable-use charging control device 200 needs an additional control command. If the power supplied to the EV 100 does not reach the set charging limit, the control unit 470 of the add-on communication device 400 may determine that the cable-use charging control device 200 does not need an additional control command.

When the additional control command is not needed, the control unit 470 of the add-on communication device 400 may continue to monitor the charged state of the EV 100.

When the additional control command is needed, the control unit 470 of the add-on communication device 400 generates the additional control command in step S318. Since the generation of the control command has been described earlier, its description is omitted in this section.

Figure 11:
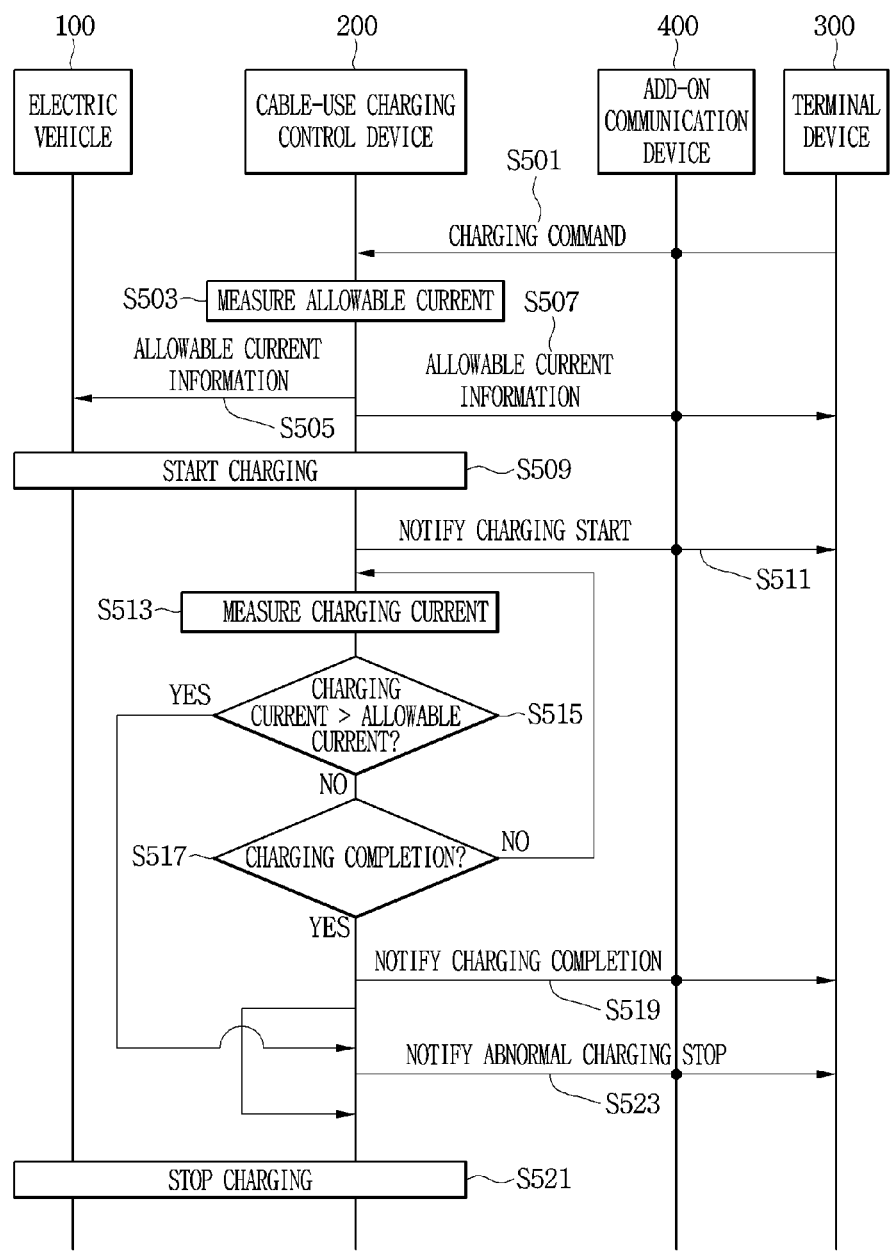
FIG. 11 is a ladder diagram showing an operating method of an electric vehicle charging system 10 according to another embodiment.

FIG. 11 is a ladder diagram showing an operating method of the EV charging system 10 according to another embodiment.

The terminal device 300 transmits a charging command to a cable-use charging control device 200 in step S501.

When the cable-use charging control device 200 receives the charging command, the control unit 270 of the cable-use charging control device 200 measures the allowable current of the EV charging cable assembly 20 through the allowable current measurement unit 239 in step S503.

In this case, the allowable current of the EV charge cable assembly 20 may also be the allowable current of the EV-side power cable assembly 50 or the allowable current of the grid-side power cable assembly 60. Also, the allowable current of the EV charging cable assembly 20 may also be an allowable current satisfying both the allowable current of the EV-side power cable assembly 50 and the allowable current of the grid-side power cable assembly 60. More particularly, the allowable current of the EV charging cable assembly 20 may also be a smaller one of the allowable current of the EV-side power cable assembly 50 and the allowable current of the grid-side power cable assembly 60.

In an embodiment, when the EV-side power cable assembly 50 is integrally attached to the cable-use charging control device 200 not to be separated therefrom and is manufactured so that the allowable current of the EV-side power cable assembly 50 is relatively high, the cable-use charging control device 200 may measure the allowable current of the grid-side power cable assembly 60 without measuring the allowable current of the EV-side power cable assembly 50.

The cable-use charging control device 200 transmits information on the measured allowable current to the EV 100 in step S505.

In this case, the cable-use charging control device 200 may transmit at least one of information on the allowable current of the EV-side power cable assembly 50, information on the allowable current of the grid-side power cable assembly 60, and information on an allowable current satisfying the two allowable currents.

The cable-use charging control device 200 transmits information on the measured allowable current to the terminal device 300 in step S507.

In this case, the cable-use charging control device 200 may transmit at least one of information on the allowable current of the EV-side power cable assembly 50, information on the allowable current of the grid-side power cable assembly 60, and information on an allowable current satisfying the two allowable currents.

The EV 100 and the cable-use charging control device 200 start charging the battery 110 of the EV 100 in step S509. In this case, the control unit 270 of the cable-use charging control device 200 may turn on a relay 220 turned off so that the EV charging cable assembly 20 may provide AC power from the socket 30 to the EV 100.

The battery charging device 115 of the EV 100 may determine a charging current based on the provided information and then take the determined charging current through the EV charging cable assembly 20 to charge the battery 110. That is, the battery charging device 115 of the EV 100 may use a charging current satisfying the allowable current of the EV charging cable assembly 20 to charge the battery 110.

The cable-use charging control device 200 notifies the terminal device 300 of a charging start in step S511.

The control unit 270 of the cable-use charging control device 200 measures the charging current through the current measurement unit 232 in step S513.

The control unit 270 of the cable-use charging control device 200 measures whether the charging current exceeds the allowable current, in step S515.

If the charging current does not exceed the allowable current, the control unit 270 of the cable-use charging control device 200 checks whether charging has been completed, in step S517.

If the charging has been completed, the EV 100 and the cable-use charging control device 200 continue to charge the battery 110 of the EV 100.

If the charging has been completed, the cable-use charging control device 200 notifies the terminal device 300 of charging completion in step S519 and stops charging the battery 110 in step S521. In this case, the control unit 270 of the cable-use charging control device 200 turns off the relay 220 turned on.

On the other hand, if the charging current exceeds the allowable current, the cable-use charging control device 200 transmits, in step S523, to the terminal device 300 an abnormal charging stop notification message notifying that the charging current has exceeded the allowable current, and stops charging the battery 110 in step S521. In this case, the control unit 270 of the cable-use charging control device 200 turns off the relay 220 turned on.

In FIG. 11, information exchange between the cable-use charging control device 200 and the terminal device 300 may also be performed without or with the add-on communication device 400.

The communication between the EV 100 and the cable-use charging control device 200, the communication between the cable-use charging control device 200 and the add-on communication device 400, the communication between the cable-use charging control device 200 and the terminal device 300 and the communication between the add-on communication device 400 and the terminal device 300 may conform to the above-described technique.

In FIG. 11, when the terminal device 300 receives information, the terminal device 300 may also display corresponding information. As an example, when the terminal device 300 receives the abnormal charging stop notification message notifying that the charging current has exceeded the allowable current, the terminal device 300 may display the fact that the charging current has exceeded the allowable current.

The plug 65 of the EV charging cable assembly 20 according to an embodiment is described below in more detail with reference to FIGS. 12 to 14.

Figure 12A:
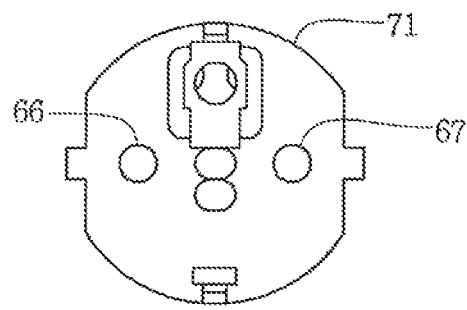
FIGS. 12a, 12b, 12c represent a plug 65 in which temperature sensors 68 and 69 are disposed, according to an embodiment.
Figure 12B:
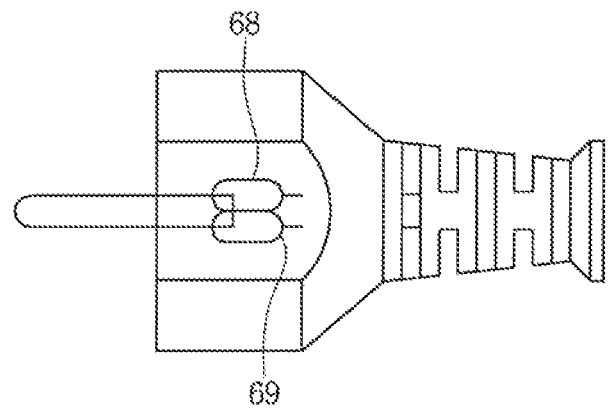
Figure 12C:
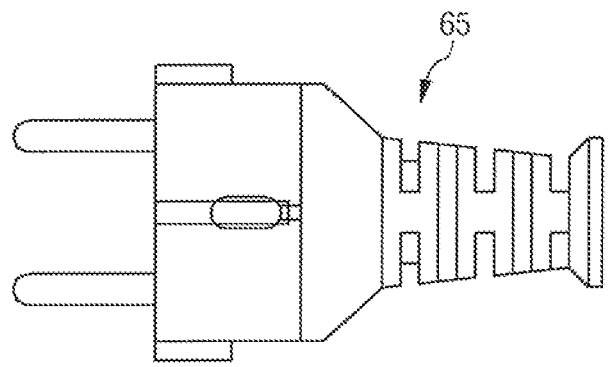

FIGS. 12*a* to 12*c* represent the plug 65 in which temperature sensors 68 and 69 are disposed, according to an embodiment. FIG. 12*a* is a front view of the plug 65 according to an embodiment, FIG. 12*b* is a side cross-sectional view of the plug 65 according to an embodiment, and FIG. 12*c* shows the inside of the plug 65 when the plug is viewed from the top, according to an embodiment.

Referring to FIGS. 12*a* to 12*c*, the plug 65 includes a pair of plug pins 66 and 67, a pair of temperature sensors 68 and 69, and a plug body 71.

The plug body 71 configures the shape of the plug 65. The pair of plug pins 66 and 67 may be inserted into the plug body 71. Also, the pair of temperature sensors 68 and 69 may be inserted into the plug body 71. The plug body 71 may transfer, heat generated from the plug pins 66 and 67, to the temperature sensors 68 and 69 through conduction. The plug body 71 may be made up of a material resistant to heat.

The pair of plug pins 66 and 67 is inserted to have bilateral symmetry about the central line of the plug body 71. The plug pins 66 and 67 are inserted into the socket 30 to supply electrical energy to the EV 100.

As shown in FIGS. 12*a* to 12*c*, the pair of temperature sensors 68 and 69 are disposed at the center of the plug body 71. In an embodiment, the temperature sensors may be vertically disposed in such a manner that they are stacked at the center of the plug body 71. The temperature sensors 68 and 69 may be disposed at the same interval from a first plug pin 66 and a second plug pin 67.

The temperature sensors 68 and 69 measure heat generated from the plug pints 66 and 67. In particular, heat is measured which may generate due to the fact that current flows into the plug pins 66 and 67 when the EV 100 is charged. In an embodiment, the temperature sensors 68 and 69 are vertically disposed and thus disposed at the same interval from the plug pins 66 and 67. Thus, the present embodiment provides two temperature sensors and thus when any one of the temperature sensors has a fault, the other temperature sensor may normally operate to measure the presence or absence of the overheating of the plug pin.

According to the above-described embodiment, since preparations may be made for a fault of any one of the pair of temperature sensors measuring the temperature of the plug pin, it is possible to enhance the safety of the EV charging cable assembly 20.

Figure 13A:
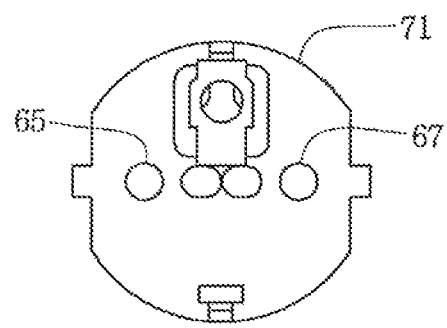
FIGS. 13a, 13b, 13c represent a plug 65 in which the temperature sensors 68 and 69 are disposed, according to another embodiment.
Figure 13B:
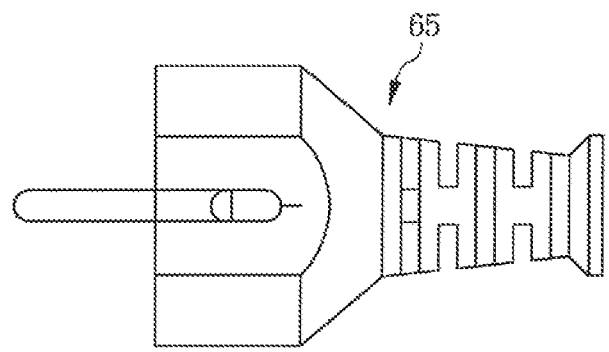
Figure 13C:
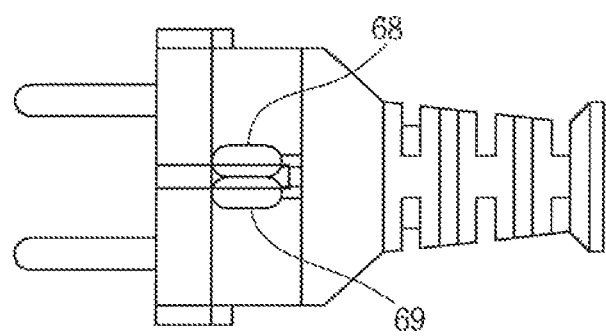
Figure 14:
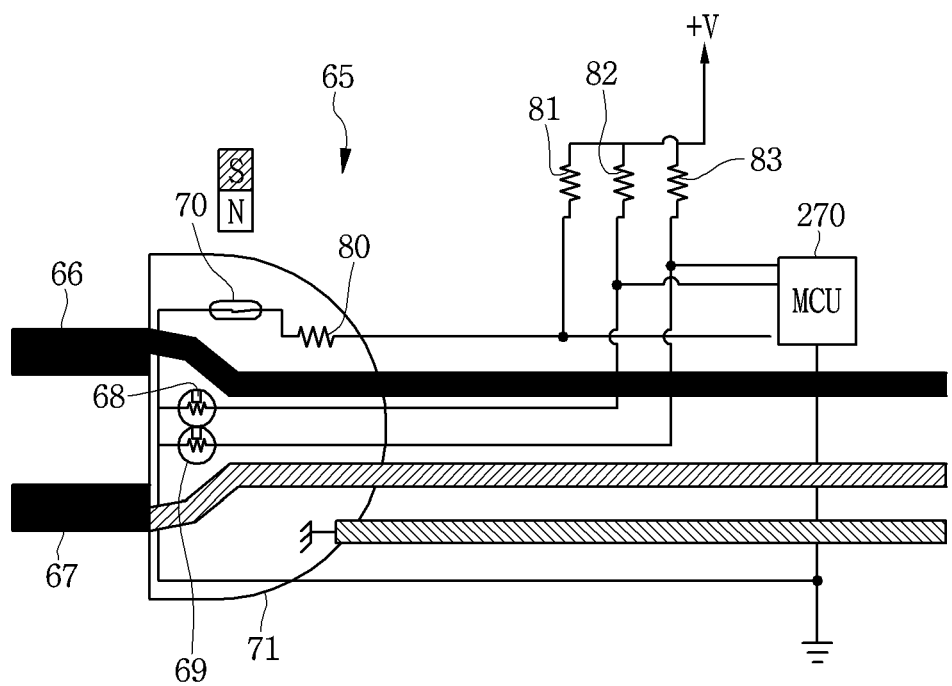
FIG. 14 represents the plug according to the embodiment in FIG. 13, in more detail.

FIGS. 13*a* to 14 represent a plug 65 according to another embodiment. FIGS. 13*a* to 13*c* represent the plug 65 in which the temperature sensors 68 and 69 are disposed, according to another embodiment.

FIG. 13*a* is a front view of the plug 65 according to the other embodiment, FIG. 13*b* is a side cross-sectional view of the plug 65 according to the other embodiment, and FIG. 13*c* shows the inside of the plug 65 when the plug 65 is viewed from the top, according to the other embodiment. The plug 65 according to the embodiment of FIGS. 13*a* to 13*c* may include the same configuration as the plug 65 according to the embodiment of FIGS. 12*a* to 12*c*.

Referring to FIGS. 13*a* to 13*c*, the temperature sensors 68 and 69 are disposed in parallel to the plug pins 66 and 67 unlike the embodiment of FIGS. 12*a* to 12*c*. In particular, the first temperature sensor 64 and the second temperature sensor 69 are disposed between the first plug pin 66 and the second plug pin 67 in parallel thereto.

In this case, each of the temperature sensors may measure the temperature of each of the plug pins. In particular, the first temperature sensor 68 may measure the temperature of the first plug pin 66 and the second temperature sensor 69 may measure the temperature of the second plug pin 67. Thus, since it is possible to measure the temperature of each of the plug pins 66 and 67 in the plug 65, the control unit 270 may determine the accurate overheated state of the plug pints.

Since heat transferred from the plug pin is transferred through the plug body 71, the closer the temperature sensor is to the plug pin, the more accurately the temperature of the plug pin may be measured. However, when the temperature sensor is disposed excessively close to the plug pin, the overheating or fault of the temperature sensor due to a direct contact between the plug pin and the temperature sensor may occur. Thus, while it is favorable to have the shortest distance possible between the temperature sensor and the plug pin, a minimum distance needs to be secured in the design. The minimum distance may be defined in an electrical device design related safety guideline.

The embodiment of FIGS. 13*a* to 13*c* is described in more detail with reference to FIG. 14. FIG. 14 represents the plug according to the embodiment of FIGS. 13*a* to 13*c*, in more detail. Components excluding the temperature sensor in FIG. 14 may also be equally applied to the embodiment of FIGS. 12*a* to 12*c*.

Referring to FIG. 14, it may be seen that the temperature sensors 68 and 69 are disposed in parallel to the plug pins 66 and 67, as described with reference to FIGS. 13*a* to 13*c*.

Also, the plug 65 according to the embodiment may include a magnetic sensor 70 and resistors 80 to 83.

The magnetic sensor 70 is a sensor that measures a magnetic field. In particular, the magnetic field is measured from the socket 30. The socket 30 includes a dedicated socket and a general socket. The dedicated socket is a socket dedicated to EV charging and indicates a socket that guarantees safety and thus supplies optimal current to the EV to be capable of decreasing a charging time. In this example, the optimal current indicates the maximum current that may secure safety, minimizing the charging time. The optimal current may vary according to the EV 100.

Since the general socket is a socket that is not the dedicated socket and does not guarantee safety, it supplies, to the EV, relatively less current than the dedicated socket. Thus, the general socket has a longer charging time than the dedicated socket.

The magnetic sensor 70 may measure a unique magnetic field emitted from the dedicated socket. The magnetic field measured by the magnetic sensor 70 is delivered to the control unit 270 which determines based on the received magnetic field whether the socket is the dedicated socket. In other words, the control unit 270 may determine a charging mode based on the magnetic field measured by the magnetic sensor 70. For example, the control unit 270 may adjust a charging current to the max when it is determined that a corresponding socket is the dedicated socket. On the contrary, when it is determined that the socket is the general socket, it is possible to adjust the charging current to a relatively lower than that of the dedicated socket.

The resistors 80 to 83 may be attached to one end of the magnetic sensor or temperature sensor. The control unit 270 may be connected to a node between the magnetic sensor 70 or the temperature sensors 68 and 69. In particular, a first resistor 80 may be attached to one end of the magnetic sensor 70 and a second resistor 81 may be attached to one end of the first resistor 80. Also, a third resistor 82 may be attached to one end of a first temperature sensor 68 and a fourth resistor 83 may be attached to one end of the second temperature sensor 69. The resistors may have different resistances, respectively.

The control unit 270 may determine the presence or absence of the fault of the magnetic sensor by using the first resistor 80 and the second resistor 81. In particular, the control unit 270 may determine a normal state, a circuit disconnection state from the magnetic sensor or a ground state by differently measuring them by using the first resistor 80 and the second resistor 81.

To particularly describe this, in the normal state, the control unit 270 may measure voltages applied to both the first resistor 80 and the second resistor 81 but when there is the circuit disconnection from the magnetic sensor 70, the control unit 270 may measure only a voltage applied to the second resistor 80 to determine the presence or absence of the disconnection of a circuit by a voltage difference. Also, when the circuit is grounded (ground fault), a voltage value of 0 is measured so that the control unit 270 may determine the presence or absence of the circuit ground.

The control unit 270 may determine the presence or absence of the disconnection of the circuit from the temperature sensors 68 and 69 by using the first resistor 82 and the fourth resistor 83. A particular determination method is the same as the determination of the disconnection of the circuit from the magnetic sensor 70 as described above.

In addition, the control unit 270 may allow the third resistor 82 and the fourth resistor 83 to have different values in order to determine the short between circuits from each of the temperature sensors. As shown in FIGS. 13a to 14, when the temperature sensors are disposed in parallel to each other, there is an advantage in that it is possible to accurately recognize the temperature of each plug pin but related circuits may be more likely to have a short because the temperature sensors are disposed adjacent to each other. Thus, measuring the short between circuits connected to the temperature sensors is a significantly important matter in stability of a charging device.

A method of measuring the short between circuits connected to the temperature sensors is described in particular. As described above, when the third resistor 82 connected to one end of the first temperature sensor 68 and the fourth resistor 83 connected to one end of the second temperature sensor 69 have different values, the control unit 270 measures different voltage values on the third resistor 82 and the fourth resistor 83 respectively having different resistances when assuming that the charging device normally operates.

However, when there is a short between circuits from the temperature sensors 68 and 69, both circuits are directly connected. As a result, the control unit 270 measures the same voltage value on circuits from the temperature sensors 68 and 69. According to the above-described mechanism, since the control unit may determine whether there is a short between circuits from the respective temperature sensors 68 and 69, it is possible to solve a short that may occur while the two temperature sensors are used.

Figure 15:
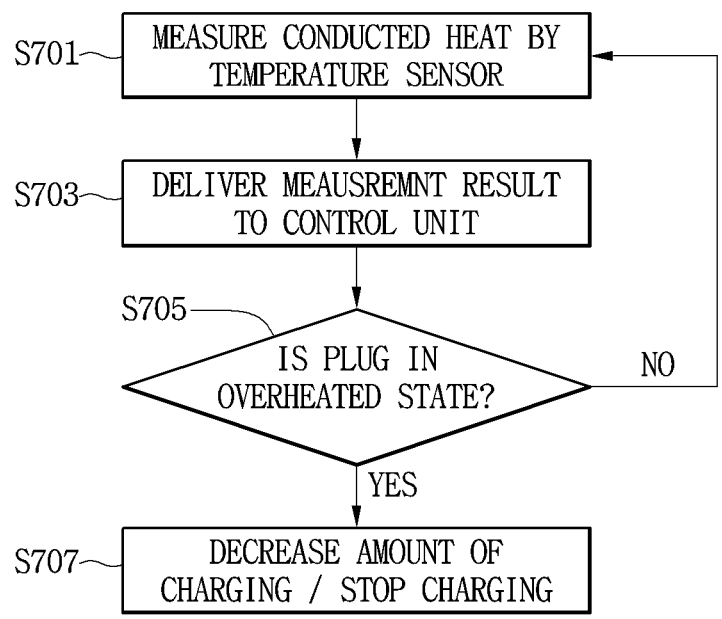
FIG. 15 is a flowchart representing a coping algorithm when measuring the overheating of a plug according to an embodiment.

FIG. 15 is a flowchart representing a coping algorithm when measuring the overheating of a plug according to an embodiment.

The temperature sensors 68 and 69 measure heat transferred through the plug body 71 in step S701.

When charging for the EV 100 is performed, heat is generated from the plug 65 inserted into the socket 30. In an embodiment, when the socket 30 is a dedicated socket, charging is performed to have a maximum amount of charging. In another embodiment, when the socket 30 is a general socket and not the dedicated socket, charging is performed to have a relatively lower amount of charging compared to charging through the dedicated socket. The presence or absence of the dedicated socket is determined by the control unit 270 based on the magnetic field measured through the magnetic sensor 70.

Heat generated from the plug 65 may be generated by the flow of a current. Heat generated in the process of charging the EV 100 is conducted through the plug body 71. In particular, heat generated from the plug pins 66 and 67 are transferred to the temperature sensors 68 and 69 through the plug body 71 by conduction.

In a first embodiment according to FIGS. 12a to 12c, the temperature sensors 68 and 69 are vertically disposed to be stacked. In this case, the temperature sensors 68 and 69 measure heat simultaneously from the first plug pin 66 and the second plug pin 67. According to the first embodiment, while it is possible to enhance stability because there is a spare temperature sensor, there may be loss in accuracy because the heat is measured simultaneously from the first plug pin 66 and the second plug pin 67.

In a second embodiment according to FIGS. 13a to 13c, the temperature sensors are disposed in parallel to the plug pins to have bilateral symmetry. In this case, the first temperature sensor 68 measures heat from the first plug pin 66 and the second temperature sensor 69 measures heat from the second plug pin 67. According to the second embodiment, since the temperature sensors are disposed to have bilateral symmetry, it is possible to enhance accuracy by measuring heat from each plug pin. On the contrary, since it is difficult to handle when the temperature sensors have faults, there may be loss in terms of safety.

Results measured from the temperature sensors 68 and 69 are transmitted to the control unit 270 in step S703. The temperature sensors 68 and 69 may convert numerical values for measured heat into electrical signals and transmit the electrical signals to the control unit 270. In particular, the resistance of the inside of the temperature sensor varies according to a variation in temperature of the plug pins and thus it is possible to recognize temperature by a variation in current value according to the variation in resistance.

The control unit 270 determines the presence or absence of the overheating of the plug pin based on the received measurement result in step S705. In particular, by determining whether the received measurement result is equal to or greater than a certain level, the control unit 270 may determine the presence or absence of overheating. The certain level may be a value set in the initial design for the stability of a device. For example, it may be a value defined by an inspection group of an electrical device including a charger.

The control unit 270 decreases an amount of charging or stops charging in step S707 when based on determination on the presence or absence of overheating, it is determined that there is an overheating state. In an embodiment, the control unit 270 may preferentially apply an action of decreasing the amount of charging before the action of stopping charging. For example, when assuming that limit temperature is 100° C., it is possible to decreasing the temperature of the plug by decreasing the amount of charging when the temperature of the plug exceeds 100° C. When the temperature of the plug continues to increase or maintains the limit temperature (e.g., 100° C.) in spite of the actions above, the control unit 270 may forcibly stop charging.

All or some of embodiments may be selectively combined and configured so that various variations may be implemented.

The EV charging cable assembly according to the embodiment may include temperature sensors in the plug to measure the overheated state of the plug and deliver a measured result to the control unit to prevent a malfunction or fire accident.

Also, by disposing the temperature sensors respectively for plug pins in the plug, it is possible to enhance accuracy in measurement of the overheating of the plug.

Also, it is possible to prevent the malfunction of a sensor by attaching resistors respectively to sensors in the plug.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A charging apparatus comprising:
a plug supplying electrical energy to an electric vehicle (EV) through a plurality of plug pins;
a plurality of temperature sensors located in the plug and measuring temperatures of the plurality of plug pins; and
a control unit determining whether the plug overheats based on the measured temperatures,
wherein the plug comprises a magnetic sensor measuring a magnetic field, and
wherein the control unit determines a charging mode based on the magnetic field measured by the magnetic sensor.

2. The charging apparatus according to claim 1, wherein the plurality of temperature sensors are located vertically between the plug pins at specific intervals from the plug pins.

3. The charging apparatus according to claim 1, wherein the plurality of temperature sensors are located between the plug pins at specific intervals from the plug pins such that the plurality of temperature sensors have bilateral symmetry.

4. The charging apparatus according to claim 1, wherein the plug further comprises a plurality of resistors each connected to one end of the magnetic sensor.

5. The charging apparatus according to claim 1, wherein the plug further comprises resistors connected to one end of each of the plurality of temperature sensors.

6. The charging apparatus according to claim 5, wherein the resistors each have a different resistance.

7. The charging apparatus according to claim 6, wherein the control unit further determines a short between circuits by using the resistors.

8. The charging apparatus according to claim 1, wherein the control unit further determines that the plug overheats when the measured temperatures are equal to or higher than a specific level.

9. The charging apparatus according to claim 8, wherein the control unit further decreases an amount of charging or stops charging when it is determined that the plug overheats.

10. The charging apparatus according to claim 9, wherein the control unit further decreases the amount of charging before stopping charging.

* * * * *